United States Patent [19]

Yamada et al.

[11] Patent Number: 5,455,649
[45] Date of Patent: Oct. 3, 1995

[54] OPTICAL SYSTEM CONTROLLING APPARATUS

[75] Inventors: Kunihiko Yamada, Tokyo; Masahide Hirasawa, Kanagawa, both of Japan

[73] Assignee: Canon Kabushiki Kaisha, Tokyo, Japan

[21] Appl. No.: 196,900

[22] Filed: Feb. 15, 1994

Related U.S. Application Data

[63] Continuation of Ser. No. 88,101, Jul. 6, 1993, abandoned, which is a continuation of Ser. No. 705,289, May 24, 1991, abandoned.

[30] Foreign Application Priority Data

May 31, 1990 [JP] Japan ................................. 2-143723
May 31, 1990 [JP] Japan ................................. 2-143724

[51] Int. Cl.$^6$ ..................................................... G03B 1/18
[52] U.S. Cl. .......................... 354/195.1; 354/402; 348/347
[58] Field of Search .......................... 354/195.1, 400, 354/402; 348/345, 347; 359/696, 697, 698, 823, 824, 825, 826

[56] References Cited

U.S. PATENT DOCUMENTS 5,005,956  4/1991  Kaneda et al. ...................... 354/402 X Primary Examiner—Howard B. Blankenship
Attorney, Agent, or Firm—Robin, Blecker, Daley & Driscoll

[57] ABSTRACT

An optical system controlling apparatus includes an optical system for moving in a predetermined direction and varying an optical characteristic, a position sensor for detecting a position of the optical system which is in operation, and a controlling circuit for moving the optical system to a predetermined initial set position and resetting the position sensor when it is detected that the optical system has reached the initial set position, the controlling circuit varying a driving speed of the optical system before and after it is detected that the optical system has reached the initial set position.

41 Claims, 12 Drawing Sheets

F I G.12
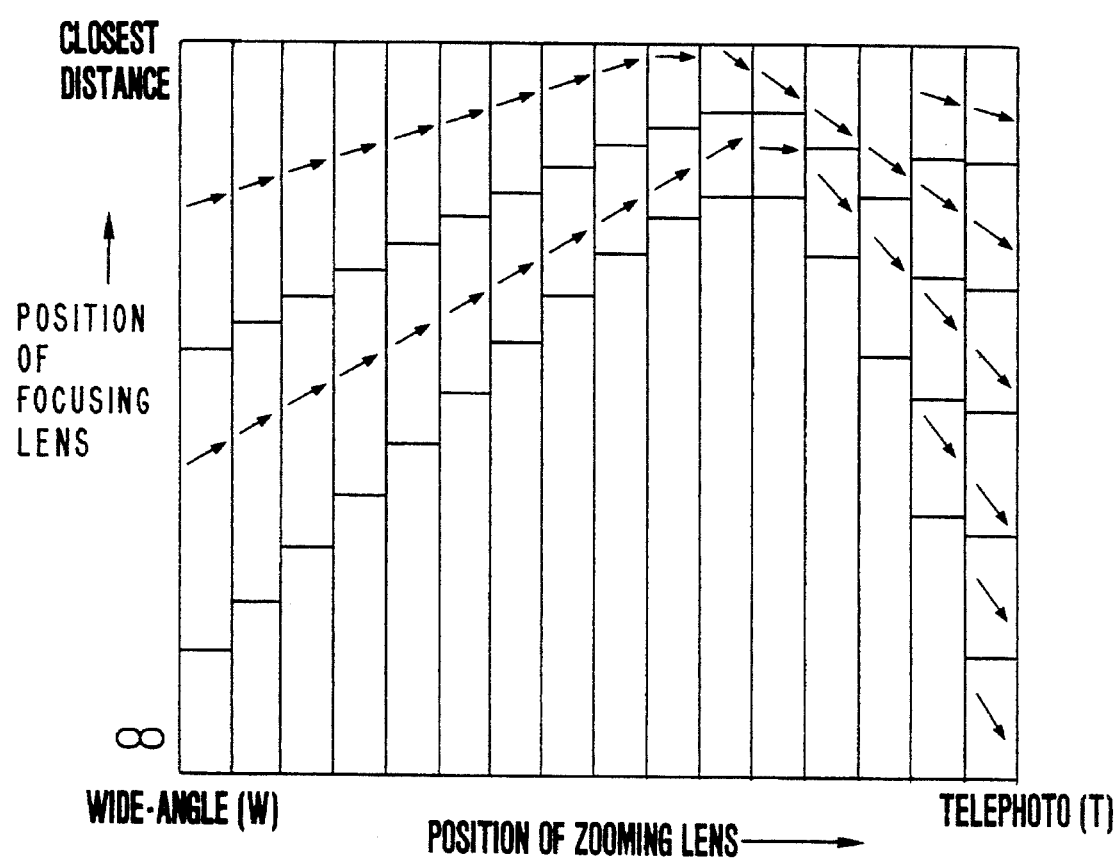

OPTICAL SYSTEM CONTROLLING APPARATUS

This is a continuation application under 37 CFR 1.62 of prior application Ser. No. 08/088,101, filed Jul. 6, 1993, abandoned, which is a continuation Ser. No. 07/705,289, filed May 24, 1991, abandoned.

BACKGROUND OF THE INVENTION

1. Field of the Invention

The present invention relates to an optical system controlling apparatus suitable for use in a video camera or the like and, more particularly, to a drive controlling apparatus for an element, such as a lens, which varies optical characteristics.

2. Description of the Related Art

The recent development of video equipment such as a video camera is remarkable and a majority of lens systems utilize autofocus (AF) which automatically detects an in-focus state. In this kind of AF system, it is necessary to detect the amount by which a focus adjusting lens is made to move forwardly in practical use. To meet this requirement, the AF system is provided with detecting means, for example, an encoder such as a slide type of variable resistor or a photosensor. A lens system whose focus adjusting lens is driven by a pulse motor or the like utilizes detecting means which is arranged to detect the required amount of forward movement of the focusing lens by counting the number of drive pulses.

In general, in a system called an inner focus type lens system or a rear focus type lens system in which focusing is performed by driving a rear lens group of the lens system, an arrangement utilizing the aforesaid pulse motor is used because no large drive torque is needed and because compensation for the movement of a focal plane during zooming can be easily performed.

FIG. 10 is a schematic view showing one example of the lens construction of this kind of inner focus type of lens system. The example shown in FIG. 10 includes a fixed first lens group 101, a second lens group (zooming lens) 102 for effecting variation of magnification, an iris 103, a fixed third lens group 104, a fourth lens group (focusing lens) 105 for performing a focus adjustment function as well as the function of compensating for the movement of a focal plane resulting from the magnification varying operation of the second lens group 102, and an image sensing plane 701.

In this kind of lens system, the same lens 105 is used to realize both compensation for the variation of the position of the focal plane during zooming and focus adjustment for focusing a subject. Since high accuracy is required for position control of the lens 105, it is necessary to accurately and rapidly detect the position of the focusing lens 105.

In a specific arrangement, a leaf switch or the like is provided for detecting the initial set position which has been set near one end of the movement range of the focusing lens 105, and the position thereof is accurately detected by opening and closing the switch in response to the movement of the focusing lens 105. For example, when a power source is turned on, the focusing lens 105 is made to move in the direction of the switch and the position of the focusing lens 105 is reset to a reference position.

The initial reset operation of the focusing lens which is performed in this kind of lens system when the power source is turned on, i.e., a sequence of reset operations for moving the focusing lens to open and close the switch for detection of the initial set position, is in essence unfavorable for an automatic focus adjustment operation itself. Accordingly, immediately after the power source is turned on, it is necessary to complete that sequence of operations in a minimum time.

In general, a mechanically operated switch produces chattering at the instant of the opening and closing operation thereof. If the opening and closing operation of the switch is not detected after the chattering is eliminated in a control circuit for a lens driving motor, a variation occurs in the detection timing of the reference position of the focusing lens, with the result that an error occurs in the position of the focusing lens.

To eliminate the chattering of the mechanical switch, it may be considered that reading of the opening and closing operation of the switch is continued during the occurrence of the chattering. However, since a certain length of time is taken until the chattering settles, it is necessary to drive the pulse motor to move the lens during that time as well. As a result, an error due to a time difference occurs between the position occupied by the lens when the switch is actually opened and the position occupied by the lens when the motor controlling circuit detects the opening and closing operation of the switch and resets the count of the pulse motor to a predetermined value.

However, if the driving speed of the pulse motor is slowed to minimize the time difference, it becomes impossible to perform a rapid reset operation.

In a case where a motor speed during the reset operation is constant, if the time required for the whole reset operation is reduced, a detection error as to the reset position will increase. If the detection accuracy of the reset position is improved, there will occur the contradictory problem that the whole reset operation requires a long time.

SUMMARY OF THE INVENTION

A first object of the present invention which has been devised to solve the above-described problems is to rapidly and highly accurately perform the reset operation of each driven part and that of position detecting means in an initialization operation executed at the start of the operation of a lens system.

A second object of the present invention is to greatly reduce the time required for a reset operation by extremely rapidly performing the reset operation of position detecting means while consistently maintaining high accuracy without lowering the accuracy of position detection as to a focusing lens in the reset operation of the position detecting means of the focusing lens.

A third object of the present invention is to provide an optical system controlling apparatus in which, during an initial reset operation or the like of a lens which varies optical characteristics, the arrival of the lens or the like at an initial set position thereof is detected by controlling the opening and closing operation of a switch for position detection as to the lens. In the optical system controlling apparatus, by changing the driving speed of the aforesaid optical system before and after such detection, it is possible to minimize the time required for the position detection while retaining the accuracy of position detection as to the lens or the like within a permissible range, and it is also possible to realize a highly accurate and rapid initial set operation which cannot be achieved with conventional apparatus.

To achieve the above-described objects, in accordance with one aspect of the present invention, there is provided an optical system controlling apparatus which comprises an optical system for moving in a predetermined direction and varying an optical characteristic, position detecting means for detecting a position of the optical system which is in operation, and controlling means for moving the optical system to a predetermined initial set position and resetting the position detecting means when it is detected that the optical system has reached the initial set position, the controlling means varying a driving speed of the optical system before and after it is detected that the optical system has reached the initial set position.

A fourth object of the present invention is to improve the accuracy of lens positioning during the initialization and normal operations of a lens system.

A fifth object of the present invention is to provide an optical system controlling apparatus which can always control lens position with high accuracy by eliminating variations in a reset operation during the initialization operation of a lens system.

A sixth object of the present invention is to provide an optical system controlling apparatus having information on the reset position of a lens to be controlled which has been stored in memory during production, so that it is possible to realize satisfactory zooming and the like without strictly controlling, particularly, the opening and closing position of a reset switch or the mounting position of the reset switch.

A seventh object of the present invention is to provide an optical system controlling apparatus which is provided with a memory element for storing a numerical value relative to the position of a lens. A position which serves as a reference for measurement of a lens position during an effective operating state is measured during assembly adjustment on the basis of the in-focus position of the lens relative to a subject placed at a predetermined subject distance, and the measured value obtained during the assembly adjustment is stored in the memory element. Accordingly, there is no need to strictly control the mounting accuracy of a switch or the like which serves to identify a measurement reference position during the effective operating state, whereby productivity and serviceability can be improved.

To achieve the above objects, in accordance with another aspect of the present invention, there is provided an optical system controlling apparatus which comprises a driven part for moving in a predetermined direction and varying an optical characteristic, detecting means for detecting a position of the driven part, memory means for storing information on a reference position relative to an initial position of the driven part, and controlling means for locating the driven part at the reference position on the basis of an output of the detecting means and the information on the reference position stored in the memory means.

In accordance with another aspect of the present invention, there is provided an optical system controlling apparatus which comprises a driven part for moving in a predetermined direction and varying an optical characteristic, detecting means for detecting that the driven part has reached a predetermined position near its reference position, memory means for storing information indicative of a relation between the predetermined position and the reference position, and controlling means for locating the driven part at the reference position on the basis of an output of the detecting means and the information stored in the memory means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 12 is a chart showing the manner in which the characteristic curves of FIG. 11 are divided into a plurality of zones and representative speeds are assigned to the respective zones.

DETAILED DESCRIPTION OF THE PREFERRED EMBODIMENTS

Preferred embodiments of the present invention will be described below with reference to the accompanying drawings.

Figure 1:
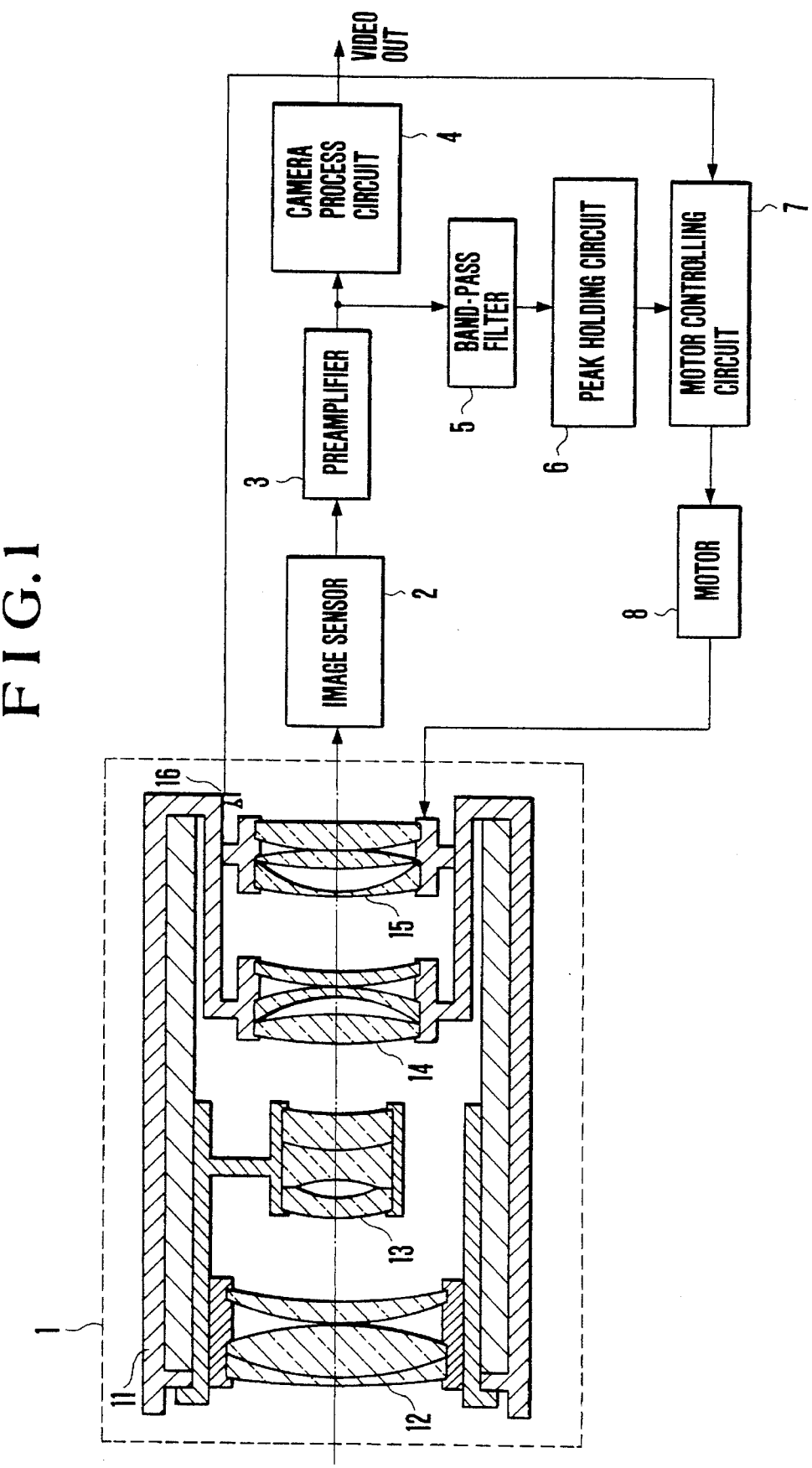
FIG. 1 is a block diagram showing an arrangement in which an optical system controlling apparatus according to the present invention is applied to a video camera.

FIG. 1 is a block diagram schematically showing one example of a video camera employing a rear focus type lens system.

The video camera shown in FIG. 1 includes a lens system 1, a lens barrel 11, a first lens group 12 and a second lens group 13. The first lens group 12 and the second lens group 13 move together to vary the focal length of the lens system 1, thereby effecting variation of magnification (zooming). The video camera also includes a fixed third lens 14, a fourth lens group (compensating and focusing lens) 15 for compensating for the displacement of a focal plane resulting from zooming, i.e., the movement of the first lens group 12 and that of the second lens group 13, as well as for performing focus adjustment, and a switch 16 for detecting the initial set position of the focusing lens 15.

The video camera also includes an image sensor 2, such as a charge-coupled device (CCD), for effecting photoelectric conversion of a subject image formed on its image sensing surface by the lens system 1 and outputting the resultant image signal, a preamplifier 3 for amplifying the image signal outputted from the image sensor 2 to a predetermined level, a camera process circuit 4 for subjecting the image signal outputted from the preamplifier 3 to predetermined processing, such as gamma correction, blanking and addition of a sync signal, and converting the image signal into a standardized video signal, a band-pass filter (BPF) 5 for extracting a high-frequency component which varies with the state of focus from the output signal of the preamplifier 3, a peak holding circuit 6 for detecting and holding a peak value, which appears during, e.g., one field period, of the high-frequency component of the image signal extracted by the BPF 5, and a motor controlling circuit 7 for driving and controlling a pulse motor 8 which causes the fourth lens group (focusing lens) 15 to move on the basis of both information on the result obtained by detecting the state of the switch 16 and the peak-value information outputted from the peak holding circuit 6 which serves as focus detecting means.

As described above, in this system, the fourth lens group (compensating and focusing lens) 15 adjusts the state of focus, and a subject image projected by the lens system 1 is photoelectrically converted into an image signal by the image sensor 2, amplified to the predetermined level by the preamplifier 3, and supplied to the motor controlling circuit 7. Subsequently, the reset operation of the focusing lens 15 is performed. The focusing lens 15 is driven in a direction in which the output peak value of the peak holding circuit 6 increases which value is updated at intervals of one field during a normal operating state, and the focusing lens 15 is stopped at a position where the peak value reaches its maximum, thereby effecting focus adjustment.

In such a rear focus type of lens system, if the first lens group 12 and the second lens group 13 of the lens system 1 are made to move to vary the focal length, i.e., to effect what is called zooming, the focal plane varies in position. To prevent the focus from moving with respect to the image sensing surface of the image sensor 2 during zooming, the motor 8 is driven to move the fourth lens group 15, thereby compensating for the displacement of the position of the focus.

Accordingly, to cause the motor controlling circuit 7 to perform the above-described operation, a means for accurately detecting the position of the fourth lens group 15 is needed. In this regard, the above-described embodiment utilizes a method of counting the number of drive pulses applied to the pulse motor 8 within the motor controlling circuit 7 and obtaining information on the position of the focusing lens 15 which is being driven.

At the time when a power source is turned on, the position of the fourth lens group 15 is indefinite. To determine the initial position of the fourth lens group 15, the switch 16 is disposed at a predetermined position for initial setting (called an "initial set position"), and the pulse motor 8 is driven to move the fourth lens group (focusing lens) 15 in the direction of the switch 16 and part of the holding barrel of the fourth lens group 15 is brought into contact with the switch 16. The initial position of the fourth lens group 15 is set by detecting a variation in the state of the switch 16.

In other words, when the holding barrel of the fourth lens group 15 comes into contact with the switch 16 and it is determined that the switch 16 has been closed, the motor controlling circuit 7 resets the count of a counter for counting the number of drive pulses applied to the pulse motor 8 to a predetermined value. More specifically, the switch 16 is mounted on the side of the fourth lens group 15 closer to an infinity end, that is, on an infinity side beyond an end position which serves as the reference of a movement range in which the fourth lens group 15 normally moves according to zooming or the state of focus. Information on the distance between the reference position of the normal movement range and the mounting position of the switch 16 is obtained by detecting that the switch 16 has been closed, and the obtained information is stored in memory. The information stored in memory is read out and set in the counter. The pulse motor 8 is reversed to cause the counter to count down, and a position where the fourth lens group 15 is located when "0" is reached is identified as the reference position of the movement range. Thus, the reset operation of the focusing lens 15 is completed.

The above-described sequence of operations (the reset operation) in which the fourth lens group 15 is made to move to open and close the switch 16 immediately after the power source is turned on, is in essence unfavorable for an automatic focus adjustment operation because such a sequence acts to delay the same. Accordingly, immediately after the power source is turned on, it is necessary to complete that sequence of operations in a minimum time.

As explained in connection with the related art, a mechanically operated switch such as the switch 16 shown in FIG. 1 generally produces chattering at the instant of the opening and closing operation thereof. If the opening and closing operation of the switch 16 is not detected after the chattering is eliminated in the motor controlling circuit 7, a variation occurs in the reset timing of the counter for detecting the reference position of the focusing lens 15, with the result that an error occurs in the position of the focusing lens 15. More specifically, in a case where a motor speed during the reset operation is constant, if the time required to perform the whole reset operation is to be reduced, a detection error as to the reset position will increase.

The motor controlling circuit 7 also executes logic control utilizing a microcomputer, and performs detection of the opening and closing of the switch 16 intermittently at predetermined intervals. Accordingly, to eliminate chattering from the mechanically operated switch, it may be considered that reading of the state of opening and closing of the switch 16 is continued while the chattering is occurring. However, in this method, since a certain period of time is required until the chattering settles, the motor controlling circuit 7 drives the pulse motor 8 to move the fourth lens group 15 during that time. As a result, an error due to a time difference occurs between the position occupied by the fourth lens group 15 when the switch 16 is actually opened and the position occupied by the fourth lens group 15 when the motor controlling circuit 7 detects the opening and closing of the switch 16 and resets the count of the number of drive pulses applied to the pulse motor 8 to the predetermined value. If the driving speed of the pulse motor 8 is slowed to some extent to reduce such an error, the time required for the reset operation becomes long; that is to say, if the detection accuracy of the reset position is increased, it will take an excessively long time to perform the whole reset operation.

Figure 2:
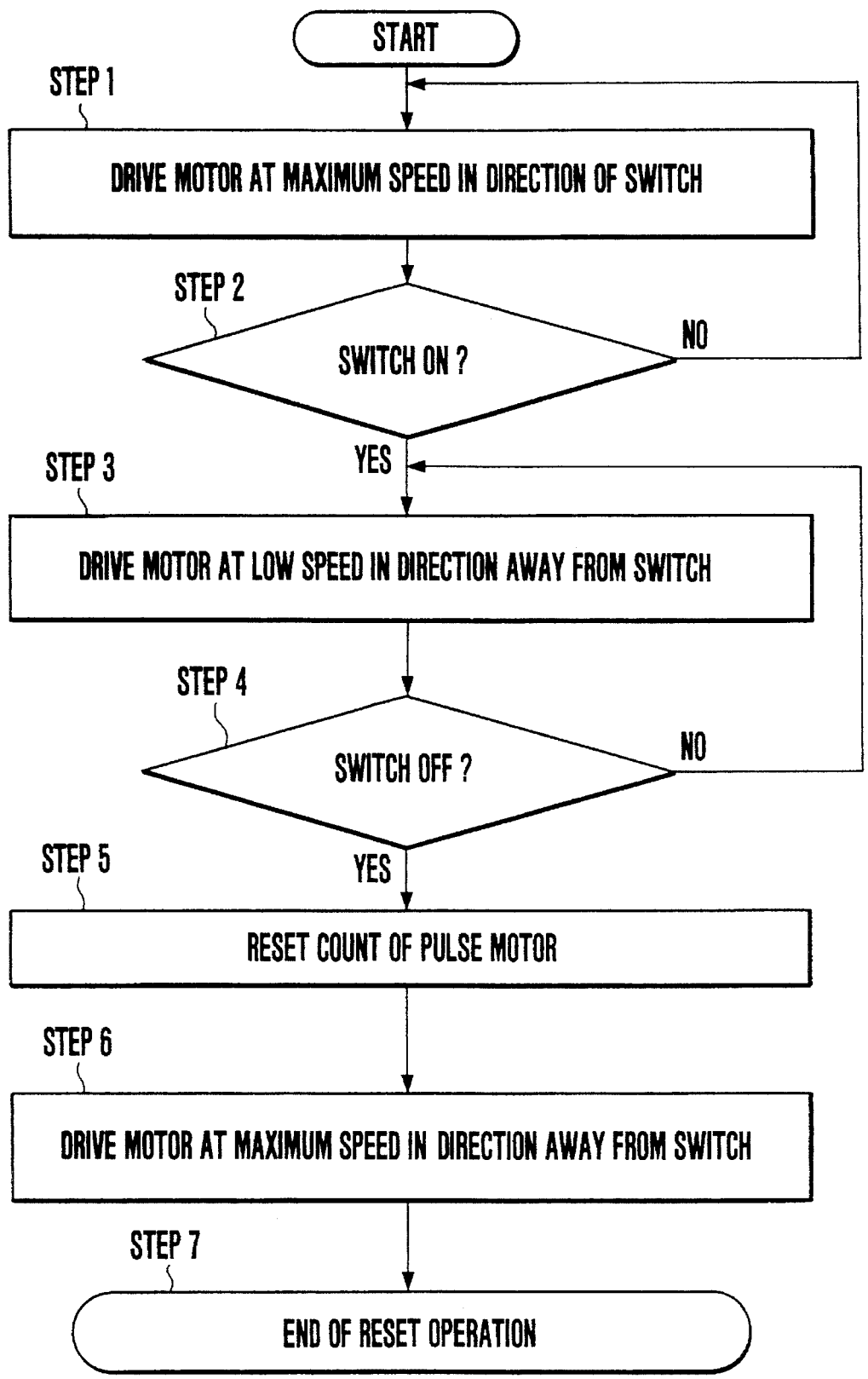
FIG. 2 is a flowchart showing an initial set operation carried out in the apparatus of the present invention.

The reset operation of the focusing lens 15 of the motor controlling circuit 7 according to the first embodiment of the present invention to solve the above-described problems, is shown in the flowchart of FIG. 2.

Referring to FIG. 2, when the control flow of the reset operation of the focusing lens 15 is started immediately after the power source is turned on, the process proceeds to Step 1, where the motor controlling circuit 7 drives the pulse motor 8 at its maximum speed so as to drive the fourth lens group (focusing lens) 15 in the direction of the switch 16.

In Step 2, if it is determined that the fourth lens group (focusing lens) 15 has come into contact with the switch 16 to close it, the process proceeds to Step 3. In Step 3, the motor controlling circuit 7 reverses the pulse motor 8 at such a low speed that an error in position detection can be accommodated within a permissible range even if the fourth lens group 15 is driven while the operation of detecting the state of the switch 16 is being performed by several times to eliminate chattering and then while the count of the pulse motor 8 is being reset to the predetermined value. Thus, the fourth lens group 15 is made to move at a low speed in a direction away from the switch 16.

If, in Step 4, the motor controlling circuit 7 detects that the fourth lens group 15 has moved away from the switch 16 and the switch 16 has been opened, the process proceeds to Step 5. In Step 5, the previously memorized information on the distance between the reference position of the normal movement range of the fourth lens group 15 and the mounting position of the switch 16 is preset in the counter for position detection as to the fourth lens group 15, thereby resetting the pulse motor 8. Then, the process proceeds to Step 6, where while the count preset in the counter is being decremented, the pulse motor 8 is driven in the direction in which the fourth lens group 15 moves away from the switch 16 at the maximum speed. If the count of the counter reaches "0", this indicates that the fourth lens group (focusing lens) 15 has reached the reference position at the end of the normal movement range. Then, in Step 7, the reset operation is brought to an end.

In accordance with the above-described reset operation, after the fourth lens group 15 comes into contact with the switch 16 and the switch 16 is closed, the fourth lens group 15 is driven in the direction away from the switch 16 in such a manner that the fourth lens group 15 is driven at a low speed only until the switch 16 is opened and, at the maximum speed, during the remaining process. In consequence, it is possible to minimize the required time of the whole reset operation while sufficiently retaining the accuracy of position detection.

Although the aforesaid embodiment has been explained in connection with the example in which a switch which mechanically opens and closes is employed as the switch for position detection as to the fourth lens group (focusing lens) 15, the present invention is not limited to such an example and is applicable to, for example, a switch using an optical sensor such as a photosensor.

Figure 3:
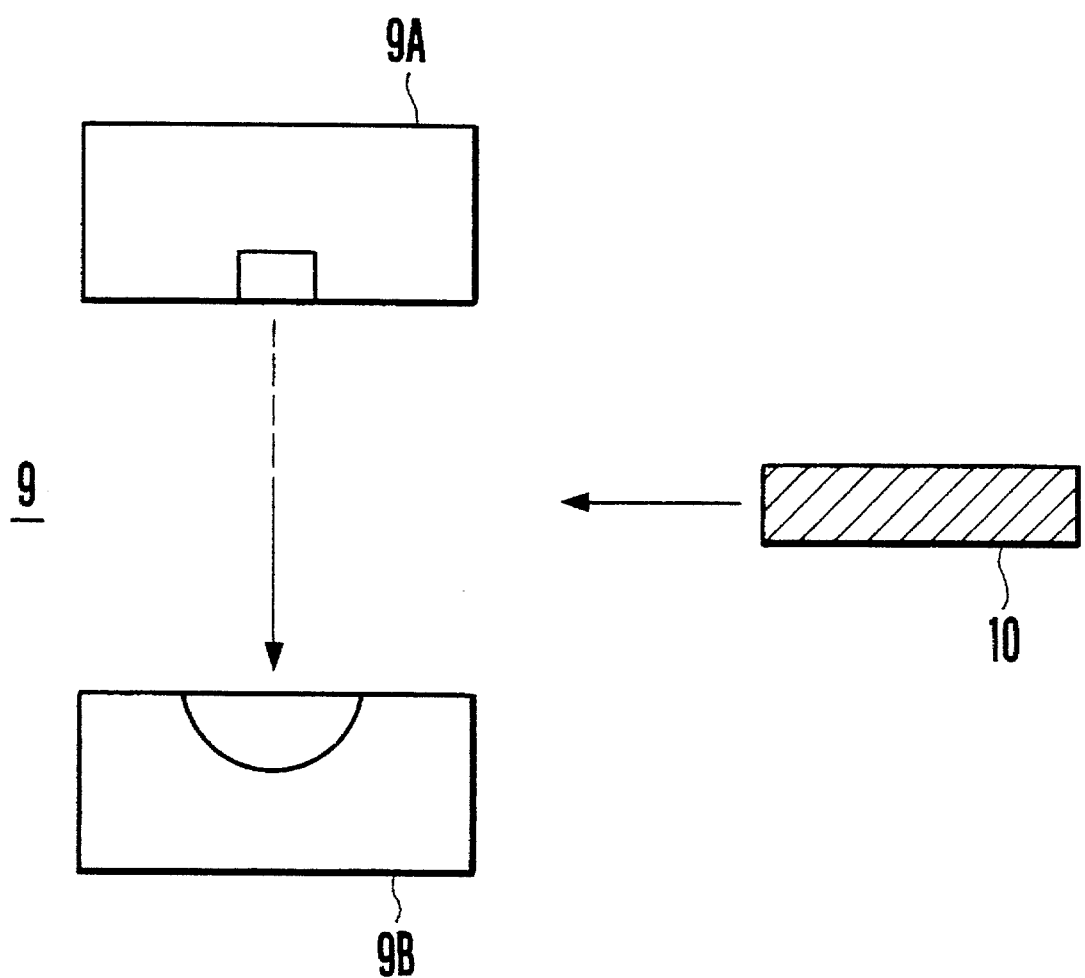
FIG. 3 is a schematic view showing another example of a position detecting switch according to the present invention.

FIG. 3 is a schematic view showing the construction of a switch using a photosensor.

Referring to FIG. 3, an optical switch 9 consists of a light emitting element 9A for emitting infrared rays or the like and a light receiving element 9B, and the light emitting element 9A and the light receiving element 9B are oppositely spaced apart by a predetermined distance. The optical switch 9 is mounted at a position corresponding to the switch 16 in FIG. 1. A light blocking plate 10 is disposed between the light emitting element 9A and the light receiving element 9B for movement in interlocked relation to the fourth lens group (focusing lens) 15. The light blocking plate 10 is arranged to change its position to transmit or block light emitted from the light emitting element 9A toward the light receiving element 9B.

The other portions are substantially identical to those shown in FIG. 1, and description is omitted.

If it is assumed that the light emitting element 9A, the light receiving element 9B and the light blocking plate 10 are located in the shown positional relation, the light emitted from the light emitting element 9A reaches the light receiving element 9B and the switch 9 is turned on. When the light blocking plate 10 moves in the direction indicated by the shown arrow and blocks the light from the light emitting element 9A, the switch 9 is turned off.

In addition, if the light blocking plate 10 is driven in a direction opposite to that of the arrow shown, the light from the light emitting element 9A again reaches the light receiving element 9B and the switch 9 is turned on.

The reset operation is performed on the basis of the above-described change in the state of the switch, and the switch using the optical sensor such as a photosensor essentially produces no chattering.

However, since the motor controlling circuit 7 shown in FIG. 1 periodically and intermittently reads the state of the switch, a time difference for a maximum of one period occurs between the time when the switch actually changes from its on state to its off state and the time when the motor controlling circuit 7 detects the change in the state of this switch. This time difference results in an error in position detection. To minimize the time difference, the driving speed of the motor must be decreased to some extent.

Accordingly, if the reset operation according to the first embodiment is applied to the arrangement using the optical switch such as a photosensor, it is possible to minimize the reset time while maintaining detection accuracy.

As is apparent from the foregoing description, in the optical system controlling apparatus according to the present invention, during an initial reset operation or the like of a lens which varies optical characteristics, the arrival of the lens or the like at an initial set position thereof is detected by controlling the opening and closing operation of a switch for position detection as to the lens. By changing the driving speed of the aforesaid optical system before and after such detection, it is possible to minimize the time required for the position detection while retaining the accuracy of position detection as to the lens or the like within a permissible range. Accordingly, it is possible to realize a highly accurate and rapid initial set operation which cannot be achieved with conventional apparatus.

The aforesaid embodiment has been explained with illustrative reference to the arrangement for rapidly and highly accurately performing an initialization operation for accurately maintaining control over the zooming lens and the focusing lens, particularly in the inner focus type lens system.

In accordance with the second embodiment of the present invention which will be described below, there is provided an optical system controlling apparatus suitable for use with a lens system which requires the above-described initialization operation, such as an inner focus type of lens system. To effect the reset operation of the lens system stably and highly accurately, the optical system controlling apparatus according to the second embodiment includes a driven part which moves in a predetermined direction to vary an optical state, detecting means for detecting the position of the driven part, memory means for storing information on a reference position relative to an initial position of the driven part, and controlling means for locating the driven part at the reference position on the basis of the reference-position information stored in the memory means and an output of the detecting means. By storing the information on the reference position in the memory means during production, it is possible to achieve an optical system controlling apparatus which can realize satisfactory zooming without strictly controlling, particularly, the opening and closing position of a reset switch or the mounting position of the reset switch.

The second embodiment as well as a background art will be described below.

Figure 10:
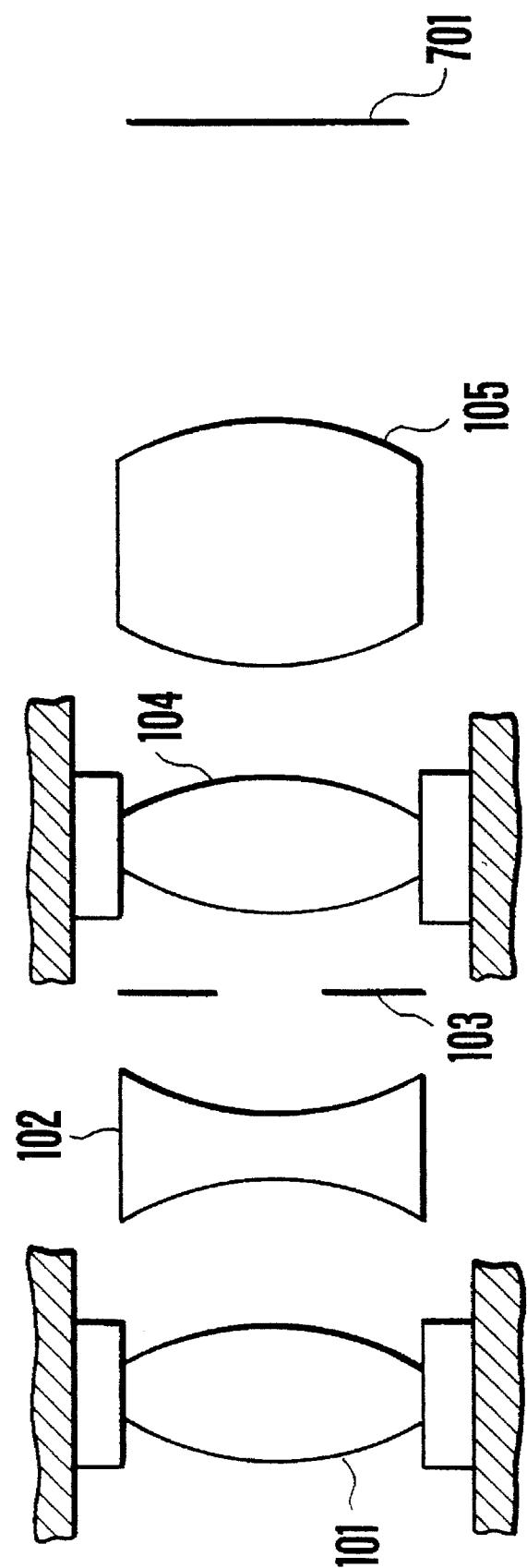
FIG. 10 is a schematic diagram showing a general inner focus type of lens system.

The basic construction of the inner focus type of lens system is as shown in FIG. 10 which has been described previously.

Figure 11:
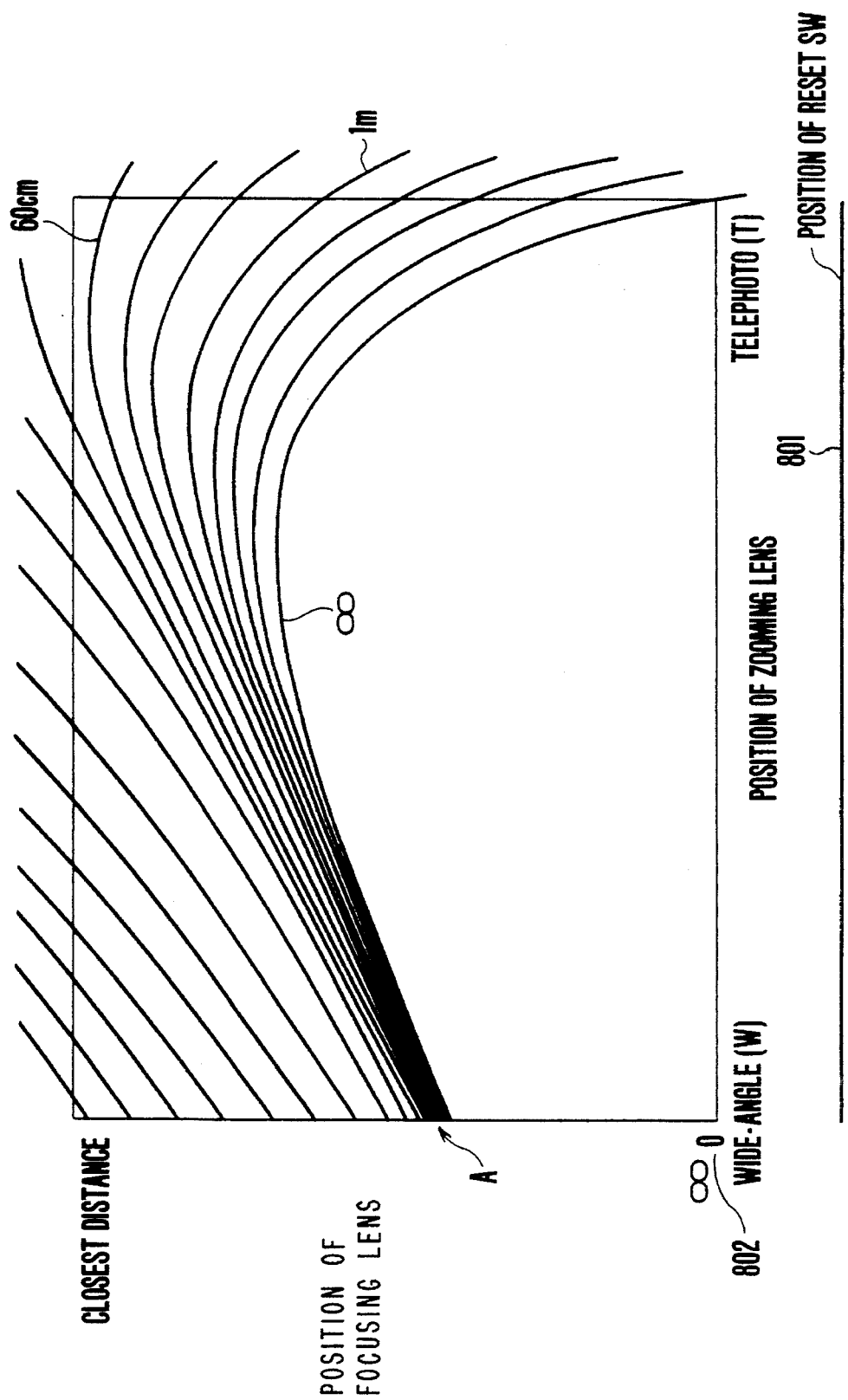
FIG. 11 is a chart showing the movement loci of zooming and focusing lenses in the inner focus type lens system.

FIG. 11 is a graphic representation using a subject distance as a parameter, and shows the loci of the fourth lens group 105 for forming an in-focus image on an image sensing surface, the fourth lens group 105 being shown as moving with respect to variations in the focal length of the inner focus type of lens system. Since the fourth lens group 105, as described above, performs both a focus adjusting function and the function of correcting the movement of the focal plane resulting from the variation of magnification, the movement of the fourth lens group 105 draws correction curves unique to individual subject distances. In other words, when zooming is to be performed, it is necessary to select one correction curve corresponding to a subject distance of interest from those shown in FIG. 2 and cause the fourth lens group 105 to move in accordance with the selected correction curve.

A method of causing the fourth lens group 105 of FIG. 10 to move along a correction locus unique to a particular subject distance is proposed in, for example, Japanese Laid-open Patent Application No. Hei 1-280709.

In this method, the loci shown in FIG. 11 are divided into zones each including a group of loci drawn at an approximately equal inclination as shown in FIG. 12, and one representative speed is assigned to each of the zones. Before zooming, if the fourth lens group 105 is located in an in-focus position with respect to a subject, a specific zone is determined from among the zones of FIG. 12 in accordance with the positions of the zooming lens 102 and the focusing lens 105. At the same time that zooming is started, the representative speed of the fourth lens group to be driven, i.e., the focusing lens 105, is determined. After the zooming has been started, the focal length and the position of the focusing lens 105 vary progressively. As a result, as shown in FIG. 12, the focusing lens 105 progressively moves from one zone to another and its representative speed also changes progressively.

By connecting the steps of displacement corresponding to the changes in the representative speed, it is possible to obtain curves which approximate those shown in FIG. 11, whereby the zooming can be performed with an in-focus state maintained.

According to the above-described method, it is necessary to select a correct zone from among the zones defined as shown in FIG. 12 and move the focusing lens 105 at the speed specified at the selected zone. Accordingly, a stepping motor or the like which can easily provide position control and which has a wide dynamic range of speed change is employed as an actuator for the focusing lens 105, and the number of drive pulses of the stepping motor is counted to detect the position of the focusing lens 105.

Accordingly, the aforesaid counter serves as an incremental type of position encoder, and if the operation of clearing the counter contents is performed, such as the operation of turning off the power source, it will be necessary to carry out the reset operation of causing the position of the focusing lens 105 to correspond to the counts of the counter.

To meet the necessity, a reset switch may be disposed at the position 801 shown in FIG. 11, i.e., at a predetermined distance from an origin 802 of the graph, and when a reset operation is to be performed, a method is used of moving the focusing lens 105 to the position 801 and presetting information on the position 801 relative to the origin 802 in the counter at that position.

However, the above-described related art has a number of problems. Since it is necessary to strictly and accurately hold the distance between the position 801 of the reset switch and the origin 802 during production, an excessively long time and a special device are needed to determine the position 801 of the reset switch during production. In addition, since it is necessary to select a reset switch for preventing a measurement error during a production process, a large increase in cost is incurred.

The second embodiment is aimed at solving the above-described problems, and one form of optical system controlling apparatus according to the second embodiment includes a driven part which moves in a predetermined direction to vary an optical state, detecting means for detecting the position of the driven part, memory means for storing information on a reference position relative to an initial position of the driven part, and controlling means for locating the driven part at the reference position on the basis of the reference-position information stored in the memory means and an output of the detecting means.

Another form of optical system controlling apparatus according to the second embodiment includes a driven part which moves in a predetermined direction to vary an optical state, detecting means for detecting that the driven part has reached a predetermined position near to a reference position thereof, memory means for storing information indicative of a relation between the predetermined position and the reference position, and controlling means for locating the driven part at the reference position on the basis of the information stored in the memory means and an output of the detecting means.

One example of the optical system controlling apparatus according to the second embodiment will be described in detail below with reference to the associated drawings.

Figure 4:
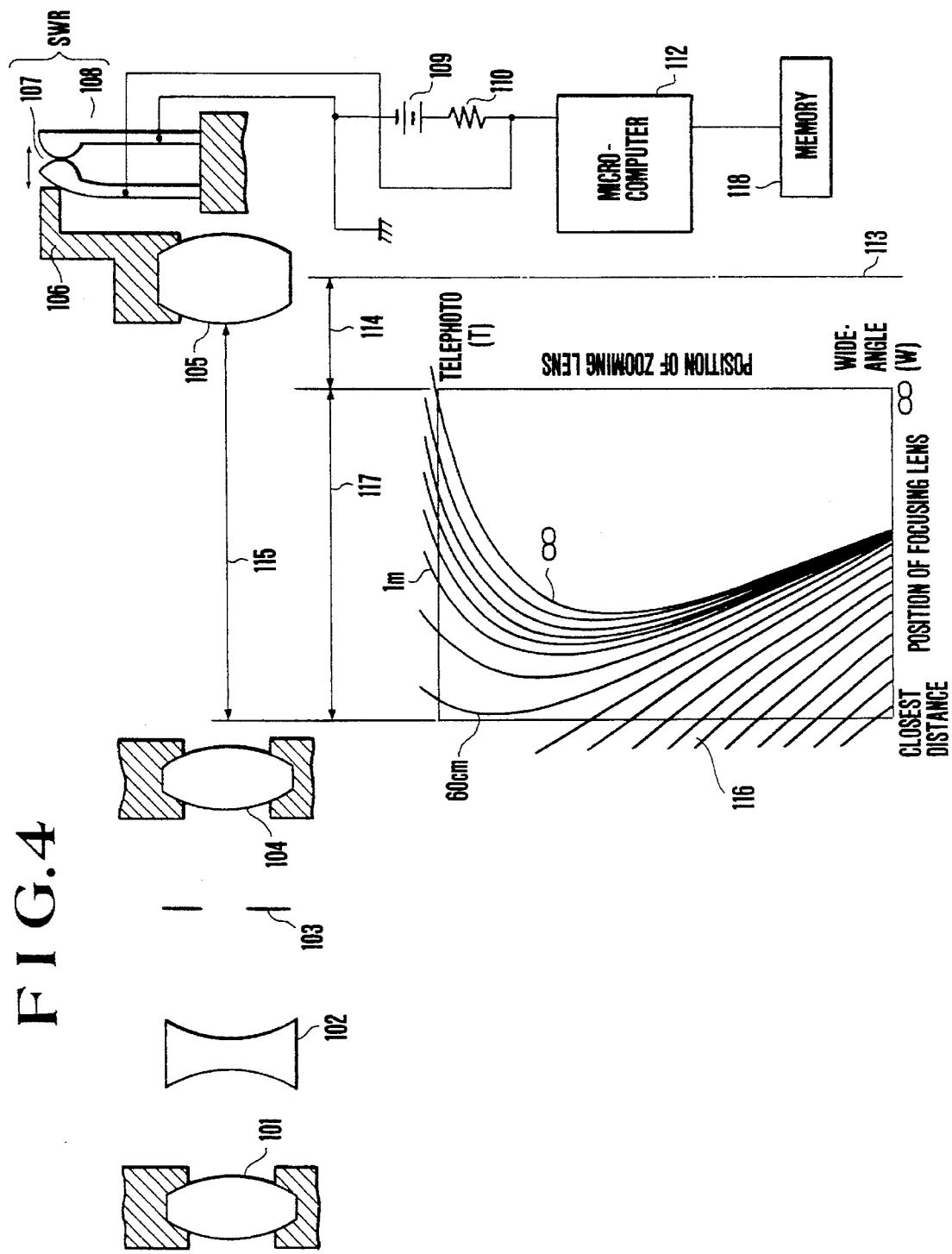
FIG. 4 is a schematic block diagram showing a second embodiment of the optical system controlling apparatus according to the present invention.

FIG. 4 is a block diagram showing the construction of the second embodiment.

Referring to FIG. 4, optical system elements 101, 102, 103, 104 and 105 each have a function substantially identical to that of the corresponding element explained in connection with FIG. 10.

Reference numeral 106 denotes an actuating member which is formed of an electrically insulating material and secured to the focusing lens 105 for movement integrally therewith, the actuating member 106 being arranged to depress a reset switch which will be described later as the focusing lens 105 moves toward an infinity end. Reference numerals 107 and 108 denote electrode pieces each constituting a leaf switch, reference numeral 109 a power source, reference numeral 110 a resistor, reference numeral 112 a control microcomputer, reference numeral 113 a reset switch position corresponding to the position 801 of the reset switch which is set on the side of the infinity end in FIG. 11, reference numeral 114 a distance between the origin position 802 of FIG. 11 and the reset switch position 113, reference numeral 115 the movable range of the focusing lens 105, reference numeral 116 curves which are represented according to the location of each of the lens groups, reference numeral 117 the movement range of the focusing lens 105 in a normal operating state, i.e., in a state wherein zooming is possible with an in-focus state maintained while the focusing lens 105 is being moved together with the zooming lens 102, and reference numeral 118 a non-volatile memory for storing information on the distance 114.

In the lens system shown in FIG. 4, when the adjustment of the first lens group 101, that is, the adjustment of a front lens, is completed, the positional relations between the first lens group 101, the second lens group 102, the iris 103, the third lens group 104 and the fourth lens group 105 are fixed in accordance with changes in focal length and subject distance. In other words, the position of the origin of each of the curves 116 is fixed with respect to the location of each of the lens groups.

Since the leaf switches 107 and 108 which constitute a reset switch SWR are mounted without adjustment, the distance 114 varies among individual lens systems. By measuring the distance 114 for each individual lens system and storing the result in the memory 118, it is possible to omit complicated adjustment of the position of the reset switch which has heretofore been needed.

Figure 5:
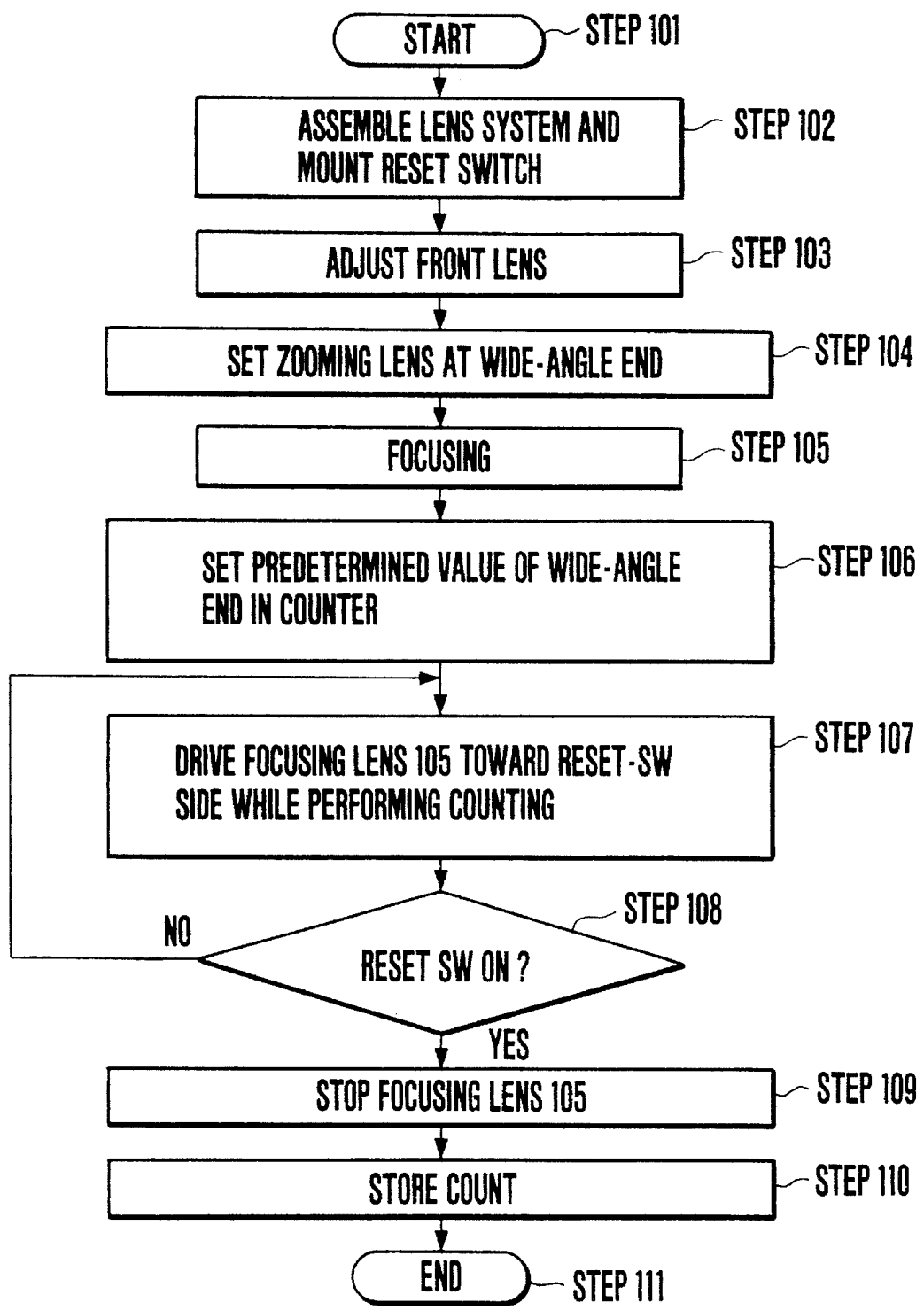
FIG. 5 is a flowchart showing a control algorithm used for adjustment in the present inventive apparatus.

FIG. 5 is a flowchart showing a program for the operation of measuring the distance 114 between the origin position of the focusing lens and the position of the reset switch, as well as for an adjustment operation.

The flowchart shown in FIG. 5 includes Step 101 which indicates the start of the program; Step 102 which indicates the operation of performing lens assembly and mounting the reset switch SWR without adjustment as described above; Step 103 which indicates the operation of adjusting the front lens; Step 104 which indicates the operation of moving the zooming lens 102 up to a wide-angle end; Step 105 which indicates the operation of moving the focusing lens 105 with respect to a subject placed at a predetermined distance and focusing an image of the subject on the image sensing surface; Step 106 where the design position of the focusing lens 105 (an in-focus position with the zooming lens 102 set to the wide-angle end for the subject distance used in Step 105) is written to a counter for position detection as to the focusing lens 105; Step 107 where counting is started with the value written in Step 106 and the focusing lens 105 is made to move in the direction of the reset switch SWR while continuing the counting; Step 108 where it is determined whether the reset switch SWR has been closed; Step 109 where the focusing lens 105 is stopped; Step 110 where the count obtained at the time of Step 109 is stored in the non-volatile memory 118.

When the operation is started in Step 101, the assembly of each lens and the mounting of the reset switch SWR are performed in Step 102, and a front lens is adjusted in Step 103. Then, the zooming lens 102 is made to move to the wide-angle end, and in Step 105 a reference subject which is placed for adjustment at a predetermined subject distance is focused. If the distance to the reference subject is, for example, 1 meter, an in-focus point will exist in the position of a point A in FIG. 11 when the zooming lens 102 is positioned at the wide-angle end. Accordingly, if the subject is in focus when the zooming lens 102 is positioned at the wide-angle end, it follows that the counter for position detection as to the focusing lens 105 has a value corresponding to the point A. Accordingly, in Step 206, the value corresponding to the point A is substituted into the counter. The value corresponding to the point A is equivalent to, for example, the number of driving steps required for the focusing lens 105 to move from the origin to the point A if a stepping motor is employed as an actuator for the focusing lens 105.

Then, in Step 207, the focusing lens 105 is made to move in the direction of the leaf switch constituting the reset switch SWR during the execution of counting and the count of the counter becomes "0" at the time when the focusing lens 105 passes through the origin. When the focusing lens 105 comes closer to the reset switch SWR beyond the origin, the count of the counter becomes a negative value.

The operation of Step 107 is repeated while looping through Steps 107 and 108 until the reset switch SWR is closed, and when the reset switch SWR is closed, the drive of the focusing 105 is stopped in Step 109.

In Step 110, the count which was obtained when the focusing lens 105 stopped in Step 109 is stored in the memory 118. Since the counter has been set to a predetermined value in Step 106 and the adjustment of the front lens has been completed, if the focusing lens 105 reaches the origin, the count indicates "0", and if the focusing lens 105 reaches the reset switch SWR, the distance between the origin and the reset switch SWR is indicated as a negative count.

Accordingly, when the counter is to be reset next time, the focusing lens 105 is made to move in the direction of the reset switch SWR until the reset switch SWR is closed, and when the reset switch SWR is closed, the stored value is substituted into the counter. Then, the focusing lens 105 is made to move in a direction opposite to that of the reset switch SWR, and the position at which the counter reaches "0" is regarded as the origin. The process of the above-described operation is shown in the flowchart of FIG. 6.

Figure 6:
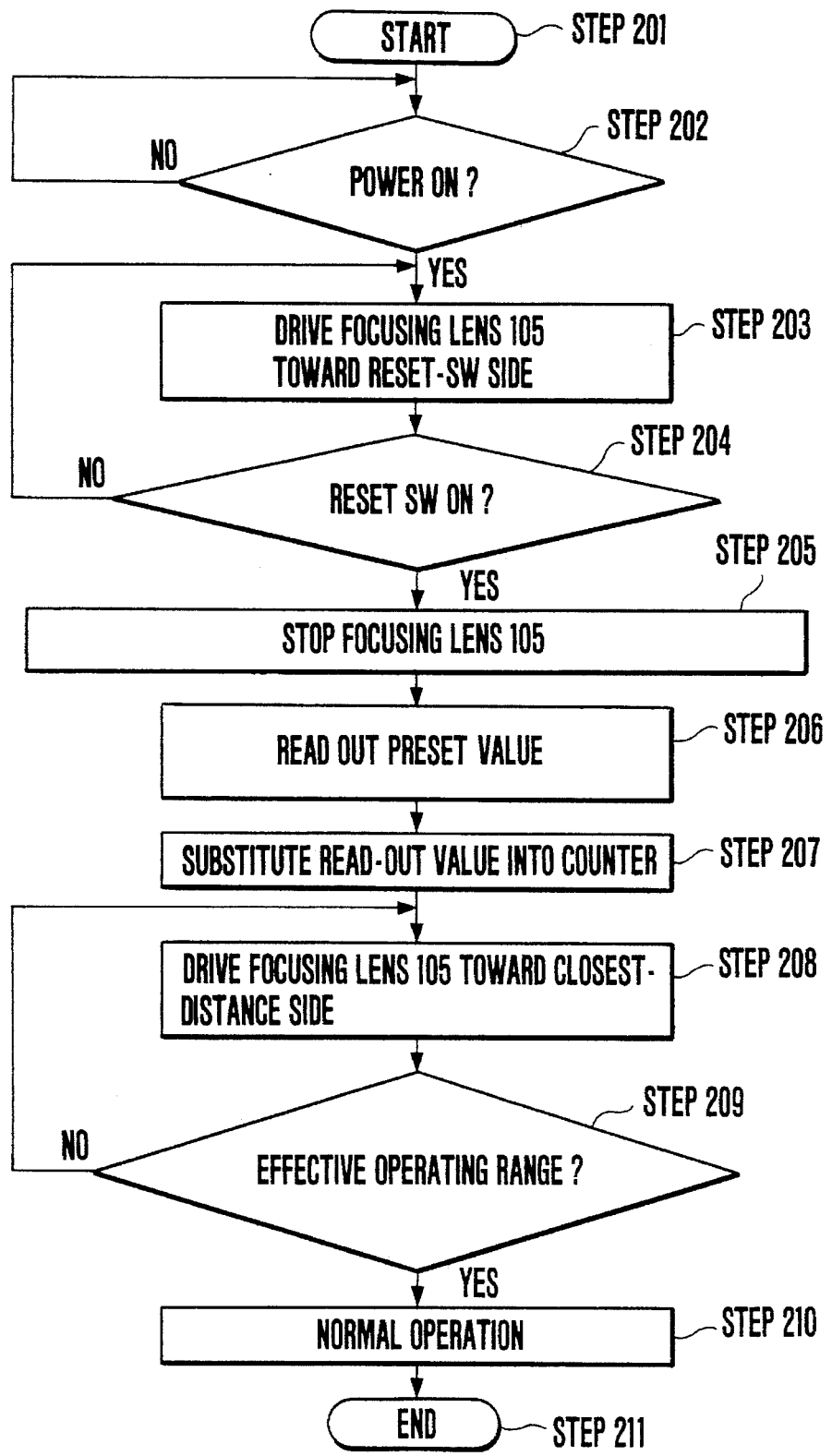
FIG. 6 is a flowchart showing a control algorithm used for effective operation of the present inventive apparatus.

The flowchart of FIG. 6 includes the following steps: Step 201 which indicates the start of the program; Step 202 where it is determined whether the power source has been turned on; Step 203 where it is determined whether the focusing lens 105 is made to move in the direction of the reset switch SWR; Step 204 where it is determined whether the reset SWR has been closed; Step 205 where the focusing lens 105 is stopped; Step 206 where a stored value equivalent to the distance 114 is read out from the memory 118; Step 207 where the value read out from the memory 118 in step 206 is substituted into the counter for position detection as to the focusing lens 105; Step 208 where the focusing lens 105 is made to move toward the closest-distance side; Step 209 where it is determined whether the value of the counter is accommodated within the normal operating range 117 in which the focusing lens 105 can move in follow-up relation to the zooming lens 102; Step 210 where normal photography is performed; and Step 211 which is a block indicating the end of the flowchart.

When the program is started in Step 201, the power source is turned on in Step 202. When the power source is turned on, the focusing lens 105 is made to move in the direction of the reset switch SWR, i.e., toward the infinity end, in Step 203. The movement of the focusing lens 105 toward the reset switch SWR is continued until it is determined in Step 204 that the reset switch SWR has been closed. When the reset switch SWR is closed, the process proceeds to Step 205, where the focusing lens 105 is stopped. At this point in time, in Step 206, the stored value equivalent to the distance 114 is read out and substituted into the counter for position detection as to the focusing lens 105. Thereafter, while counting is being performed, the focusing lens 105 is driven toward the closest-distance side, i.e., in the direction away from the reset switch SWR. When it is determined in Step 209 that the count has reached "0" which indicates that the focusing lens 105 has entered the normal operating range 117, the normal photographic operation of Step 210 is started.

With the above-described control operation, even if the reset switch SWR is assembled into a lens system with its position remaining non-adjusted, it is possible to accurately set the origin shown in FIG. 11 within the movement range of the focusing lens 105 by storing in memory information on the distance between the mounting position of the reset switch SWR and the origin on which the normal operating range starts.

The second embodiment has been explained with reference to the case where the reset switch SWR is positioned on a negative-count side with respect to the origin. In addition, it is apparent that completely the same method also makes it possible to accurately fix the coordinates of the characteristic curves of FIG. 11 within the movement range of the focusing lens 105 even if the reset switch SWR is positioned on a positive-count side from the origin.

In the second embodiment, a subject is focused with the zooming lens set to the wide-angle end and a predetermined numerical value is substituted into the counter for position detection as to the focusing lens. However, since it is also possible to execute a similar operation with the zooming lens set to the telephoto end, whether the wide-angle setting or the telephoto setting is utilized can be arbitrarily determined for each of production and adjustment processes.

Figure 7:
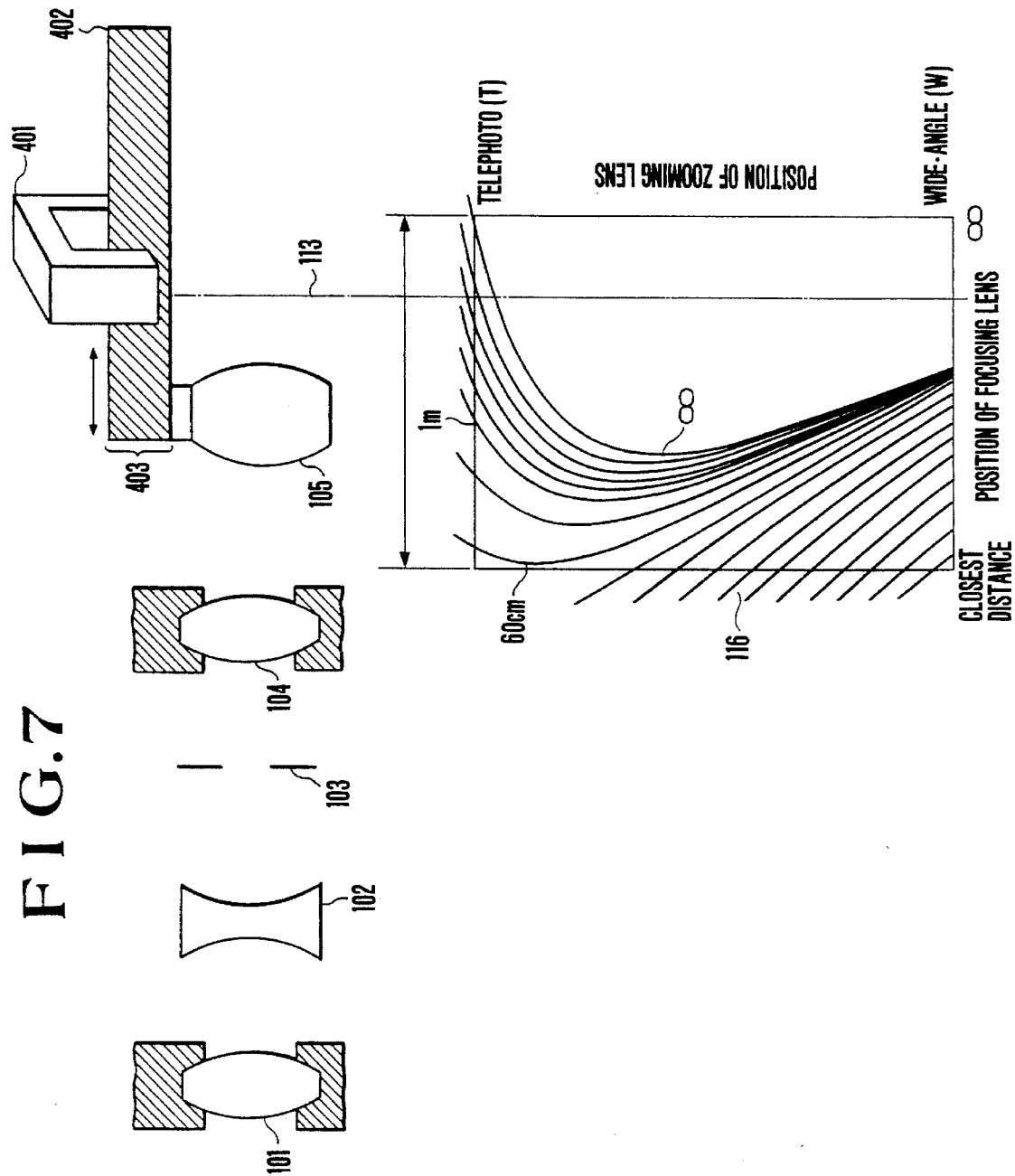
FIG. 7 is a schematic block diagram showing a third embodiment of the optical system controlling apparatus according to the present invention.

FIG. 7 shows a third embodiment of the present invention, and the same reference numerals are used to denote constituent elements which have functions substantially equivalent to those of the elements shown in FIG. 4. Referring to FIG. 7, a non-contact switch 401 includes a light emitting sensor and a light receiving sensor which are opposed to each other, and a light blocking plate 402 is made to move between the light emitting and receiving sensors along an optical axis, thereby opening or closing the gate of a light receiving part to vary the output thereof. As one end 403 of the light blocking plate 402 passes through the switch 401, a count is written to and read from the non-volatile memory 118 of FIG. 4 which has been explained in connection with the second embodiment. Since the non-contact switch used in the third embodiment is publicly known, the construction is shown in FIG. 8 in top plan and detailed description is omitted.

Figure 8:
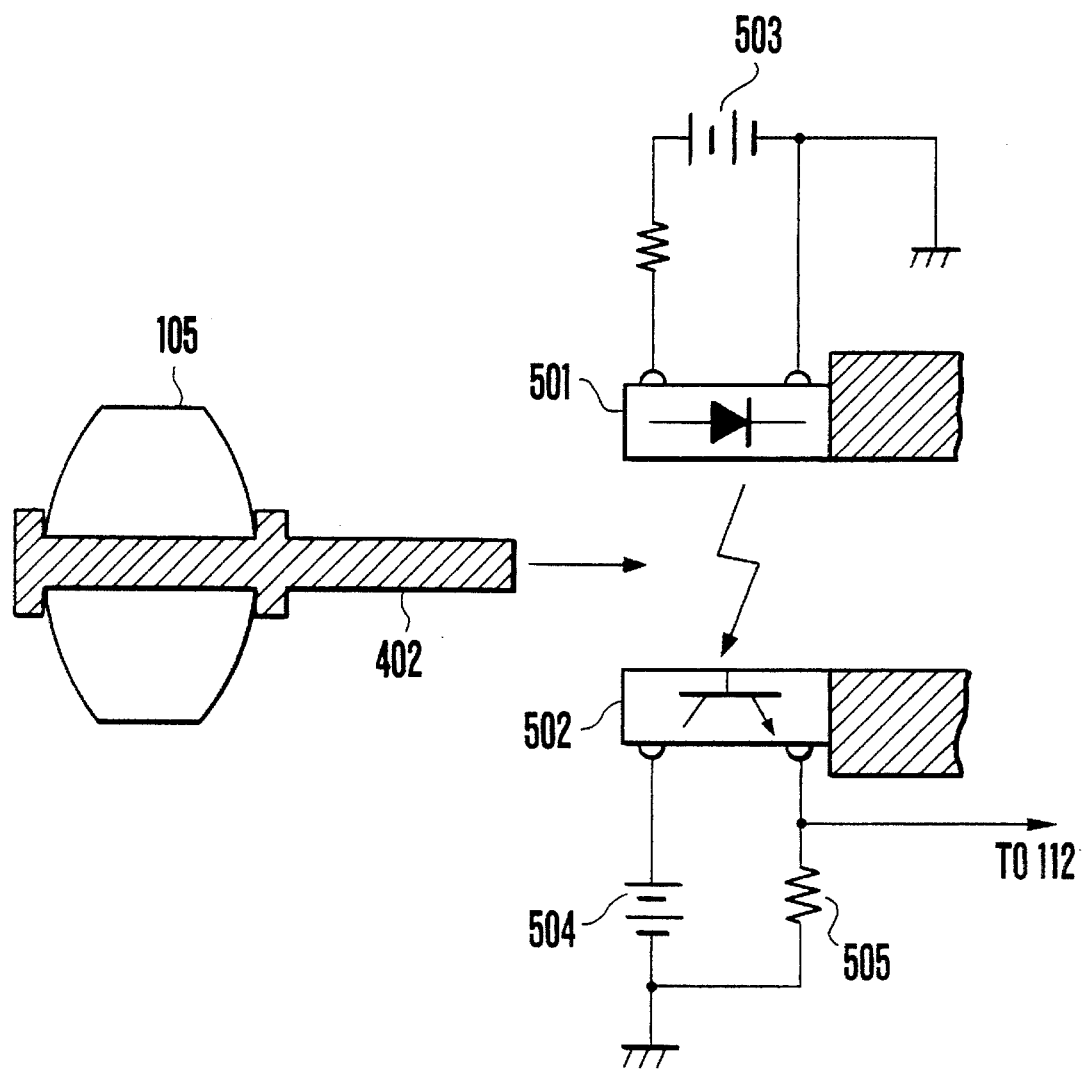
FIG. 8 is a schematic top plane view showing a switch for detection of the reset position of the focusing lens shown in FIG. 7.

Referring to FIG. 8, the switch 401 includes a light emitting element 501, a light receiving element 502 such as a phototransistor, power sources 503 and 504 such as batteries and a resistor 505.

Figure 9:
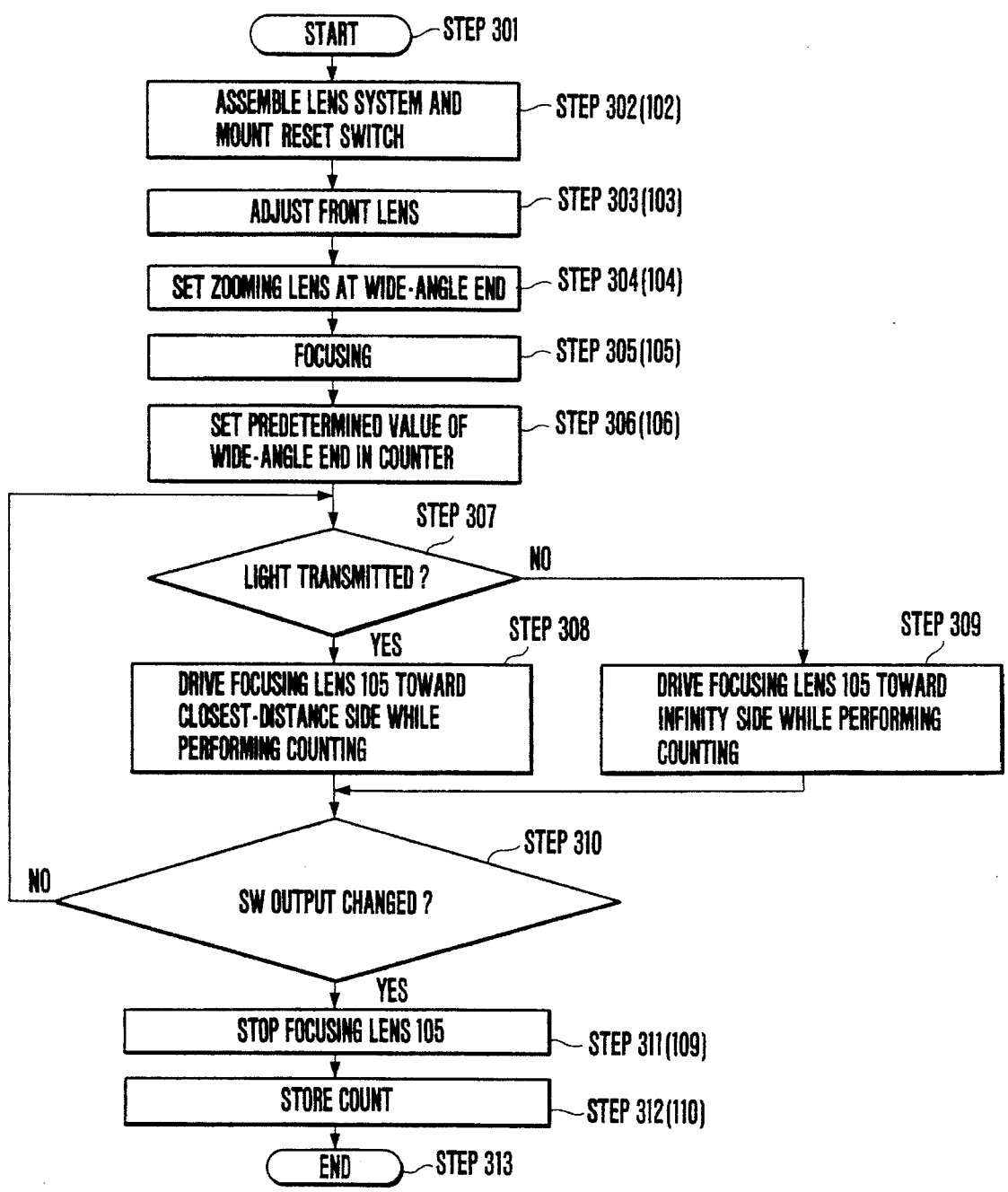
FIG. 9 is a flowchart showing the operation of the third embodiment.

Writing to the non-volatile memory 118 is basically similar to that performed in the second embodiment. A flowchart of a writing procedure for the memory 118 is shown in FIG. 9. In FIG. 9, steps similar in function to those shown in the flowchart of FIG. 5 are denoted by parenthesized reference numerals which are identical to those of FIG. 5. The flowchart of FIG. 9 includes the following steps: Step 301 which indicates the start of the program; Steps 302 to 306 for performing processing similar to that executed in Steps 102 to 106 of FIG. 5; Step 307 where it is determined whether light from the light emitting element 501 is blocked by the light blocking plate 402 within the switch 401; Step 308 where, while counting is being performed, the focusing lens 105 is made to move toward the closest-distance side; Step 309 where the focusing lens 105 is made to move to the infinity end in a similar manner; Step 310 where it is determined whether the output of the switch 401 (the light receiving element 502) has changed, i.e., whether the state of light has changed from blocked to transmitted or from transmitted to blocked; Steps 311 and 312 for performing processing executed in Steps 109 and 110 of FIG. 5; and Step 313 which indicates the end of the program.

Accordingly, when the program is started in Step 301, each lens and the reset switch 401 are assembled in Step 302 as in the second embodiment. When the adjustment of the front lens has been completed in Step 303, the zooming lens 102 is set to the wide-angle end or the telephoto end in Step 304. In Step 305, a subject located at a predetermined subject distance is focused. In Step 306, a design count indicative of the in-focus position of the focusing lens 105 for the aforesaid predetermined subject distance with the zooming lens 102 set to the wide-angle end or the telephoto end, is substituted into the counter. In Step 307, it is determined whether light is being transmitted, and Step 308 or 309 is selected so as to move, while performing counting, the focusing lens 105 in a direction in which the end 403 of the light blocking plate 402 moves toward the switch 401. (If light is being transmitted, the focusing lens 105 is driven toward the closest-distance end, while if light is blocked, it is driven toward the infinity end.) In Step 310, it is determined whether the end 403 of the light blocking plate 402 has passed through the switch 401 on the basis of variations in the output of the light receiving element 502. If the end 403 has not yet passed through the switch 401, the operation of Step 308 or 309 is repeated.

When the end 403 passes through the switch 401, the focusing lens 105 is stopped in Step 311, and in Step 312 the count obtained at that time is stored in the memory 118 as in the case of the second embodiment.

By executing the above-described control, it is possible to accurately fix the origin of the normal operating range even if assembly is performed with the position of the switch 401 remaining non-adjusted.

As is apparent from the foregoing, in accordance with the present invention, a memory element for storing a numerical value relative to the position of a lens is provided, and a position which serves as a reference for measurement of a lens position during an effective operating state is measured during assembly adjustment on the basis of the in-focus position of the lens relative to a subject placed at a predetermined subject distance. The measured value obtained during the assembly adjustment is stored in the memory element. Accordingly, there is no need to strictly control the mounting accuracy of a switch or the like which serves to identify a measurement reference position during the effective operating state, whereby productivity and serviceability can be improved.

What is claimed is:

1. An optical system controlling apparatus comprising:
    (A) an optical system for varying an optical condition;
    (B) position detecting means for detecting a position of said optical system which is in operation; and
    (C) controlling means for moving said optical system to a predetermined initial set position at a high speed, reversing movement of said optical system when said optical system passes said initial set position and resetting said position detecting means when it is detected that said optical system has again reached the initial set position.

2. An optical system controlling apparatus according to claim 1, wherein said optical system includes a focusing lens.

3. An optical system controlling apparatus according to claim 2, wherein said optical system includes a zooming lens.

4. An optical system controlling apparatus according to claim 3, wherein said optical system is of an inner focus type.

5. An optical system controlling apparatus according to claim 4, further comprising zooming-position detecting means for detecting a position of said zooming lens, said controlling means determining a driving speed of said focusing lens which is in a normal operation on the basis of the position of said zooming lens detected by said zooming-position detecting means and the position of said focusing lens detected by said position detecting means.

6. An optical system controlling apparatus according to claim 1, wherein said controlling means moves said optical system at said high speed until said optical system reaches the initial set position, and slows down said optical system upon detection by said position detecting means that said optical system has reached the initial set position and moves said optical system at said high speed following said detection that said optical system has reached the initial set position.

7. An optical system controlling apparatus according to claim 4, wherein the initial set position is set to a position which is reached by said focusing lens when said focusing lens is made to move in an infinity direction beyond an infinity end thereof by a predetermined amount.

8. An optical system controlling apparatus according to claim 7, wherein said controlling means includes a detecting switch for detecting that said optical system has reached the initial set position, said controlling means resetting a counter for detection of the position of said focusing lens which is being driven, on the basis of a detection result provided by said detecting switch.

9. An optical system controlling apparatus comprising:

(A) a driven part for moving and varying an optical characteristic;

(B) first detecting means for detecting a position of said driven part;

(C) second detecting means for detecting that said driven part has reached a predetermined position spaced a predetermined distance from a reference position;

(D) memory means for storing information relative to the predetermined distance; and (E) controlling means for locating said driven part at the reference position on the basis of an output of said first detecting means and the information stored in said memory means.

10. An optical system controlling apparatus according to claim 9, wherein said driven part includes a focusing lens.

11. An optical system controlling apparatus according to claim 10, further comprising a zooming lens.

12. An optical system controlling apparatus according to claim 11, wherein said driven part is an inner focus type of optical system.

13. An optical system controlling apparatus according to claim 12, wherein said detecting means includes focusing-position detecting means for detecting a position of said focusing lens, said optical system controlling apparatus further comprising zooming-position detecting means for detecting a position of said zooming lens, said controlling means determining a driving speed of said focusing lens which is in a normal operation on the basis of the position of said zooming lens detected by said zooming-position detecting means and the position of said focusing lens detected by said focusing-position detecting means.

14. An optical system controlling apparatus according to claim 12, wherein the predetermined position is set to a position which is reached by said focusing lens when said focusing lens is made to move in an infinity direction beyond an infinity end thereof by a predetermined amount.

15. An optical system controlling apparatus according to claim 12, wherein the reference position is an infinity end of said focusing lens.

16. An optical system controlling apparatus according to claim 15, wherein said detecting means is a leaf switch.

17. An optical system controlling apparatus comprising:

(A) a driven part for moving in a predetermined direction and varying an optical characteristic;

(B) detecting means arranged at a predetermined position near a reference position for detecting that said driven part has reached the reference position;

(C) memory means for storing information relative to a distance between the predetermined position and the reference position; and (D) controlling means for performing an initialization of said driven part, for moving said driven part to the reference position to locate said driven part at the reference position on the basis of an output of said detecting means and the information stored in said memory means.

18. An optical system controlling apparatus according to claim 17, wherein said driven part includes a focusing lens.

19. An optical system controlling apparatus according to claim 18, further comprising a zooming lens.

20. An optical system controlling apparatus according to claim 19, wherein the initial position is set to a predetermined position which is reached by said focusing lens when said focusing lens is made to move in an infinity direction beyond an infinity end thereof.

21. An optical system controlling apparatus according to claim 19, wherein the reference position is an infinity end of said focusing lens.

22. A lens controlling apparatus, comprising:

(A) a lens;

(B) lens position detecting means for detecting a position of said lens upon movement thereof;

(C) a detecting switch for detecting that said lens has reached a predetermined initial set position; and (D) control means for driving said lens to said predetermined initial set position and for initializing said lens position detecting means in response to consecutive first and second state operations of said detecting switch.

23. An apparatus according to claim 22, wherein said detecting switch is disposed near said initial set position and is arranged to take one state when said lens has passed through said initial set position and moved a predetermined distance thereafter and to take its other state when movement of said lens has been reversed in direction.

24. An apparatus according to claim 23, wherein said control means is arranged to reverse its driving direction of said lens in response to said detecting switch taking said one state and to initialize said lens position detecting means in response to said detecting switch taking said other state.

25. An apparatus according to claim 24, wherein said apparatus includes memory means for storing information relative to a predetermined distance between said initial position and a location of said detecting switch, and said control means is arranged to substitute said information of said predetermined distance stored in said memory means into said position detecting means when said detecting switch has taken said one state and said movement direction of said lens has been reversed thereafter and to detect that said lens has reached said initial position after said detecting switch has taken said other state.

26. An apparatus according to claim 25, wherein said control means is arranged to drive the lens at a high speed until said detecting switch takes said one state, to drive the lens at a low speed until said detecting switch takes said other state after its has taken its one state, and to drive the lens at a high speed until it reaches said initial position after said detecting switch has taken its other state.

27. An apparatus according to claim 22, wherein said lens is driven by a stepping motor and said lens position detecting means comprises a counter which is arranged to count step driving pulses supplied to said stepping motor.

28. An apparatus according to claim 22, wherein said lens is a focusing lens and said initial position is set at a position outside of an infinite end.

29. A lens controlling apparatus, comprising:

(A) a lens;

(B) lens position detecting means for detecting a position of said lens on movement thereof;

(C) detecting means for detecting that said lens has reached a predetermined position spaced by a predetermined distance from a predetermined initial set position;

(D) memory means for storing information relative to said predetermined distance; and (E) control means arranged to reverse directional movement of said lens when it is detected by said detecting means that said lens has passed through said initial set position and reached said predetermined position and to substitute said information stored in said memory into said lens position detecting means and subtract a content of said lens position detecting means, thereby locating said lens at said initial set position.

30. An apparatus according to claim 29, wherein said lens is a focusing lens and is driven by a stepping motor.

31. An apparatus according to claim 30, wherein said lens position detecting means comprises a counter for counting step driving pulses supplied to said stepping motor.

32. An apparatus according to claim 31, wherein said detecting means can take first and second states and is arranged to take said first state when said lens has reached said predetermined position and to take said second state when the direction of movement of said lens has been reversed and said lens is moved away from said predetermined position.

33. An apparatus according to claim 32, wherein said control means is arranged to substitute said information relative to said predetermined distance stored in said memory means into said position detecting means when said detecting means has taken said first state, the direction of movement of said lens has been reversed thereafter and said detecting means has taken said second state, and to detect that the lens has reached said initial position by counting down the information relative to said predetermined distance.

34. An apparatus according to claim 33, wherein said control means is arranged to drive the lens at a high speed until said detecting means takes said first state, to drive the lens at a low speed until said detecting means takes said second state after it has taken said first state, and to drive the lens at a high speed until it reaches said initial position after said detecting means has taken said second state.

35. An apparatus according to claim 29, wherein said lens is a focusing lens and said initial position is set at a position outside of an infinite end.

36. A lens controlling apparatus, comprising:

(A) a lens;

(B) lens position detecting means for detecting a position of said lens;

(C) initial set position detecting means for detecting that said lens reaches a predetermined initial set position; and (D) control means for driving said lens to said initial set position and reversing a driving direction of said lens in response to said lens passing through said initial set position and for resetting said lens position detecting means in response to said lens reaching said initial set position in the reversed driving direction of said lens.

37. An apparatus according to claim 36, wherein said initial set position detecting means is located near the initial set position and is turned ON (or OFF) when the lens passes the initial position and moves a predetermined distance from the initial position, and is turned ON (or OFF) when the lens driving direction is reversed.

38. An apparatus according to claim 37, wherein said control means reverses the driving direction of the lens in response to the turning ON of the initial set position detecting means and initializes the lens position detecting means in response to the turning OFF of said initial set position detecting means.

39. An apparatus according to claim 38, further comprising memory means for storing the predetermined distance between the initial set position and the initial set position detecting means, wherein said control means, when the detection means is turned OFF by the reversing of the lens driving direction after the turning ON of the detection means, introduces the predetermined distance information stored in the memory means into the position detection means and down-counts the predetermined distance information to detect arrival of the lens at the initial set position.

40. An apparatus according to claim 39, wherein said control means drives the lens at a high speed until said initial set position detecting means is turned ON and drives the lens at a low speed after said initial set position detecting means is turned ON until it is turned OFF, and after the turning OFF up to the initial set position, drives the lens at a high speed.

41. An apparatus according to claim 36, wherein said lens is a focus lens driven by a stepping motor, and the lens position detecting means is composed of a counter which counts step drive pulses of the stepping motor.

* * * * *